United States Patent [19]
Tanji

[11] 3,922,799
[45] Dec. 2, 1975

[54] EDUCATIONAL EXERCISING APPARATUS
[75] Inventor: Mikiharu Tanji, Mie, Japan
[73] Assignee: Ise Electronics Corporation, Ise, Japan
[22] Filed: Oct. 31, 1973
[21] Appl. No.: 411,288

[30] Foreign Application Priority Data
Nov. 8, 1972 Japan.............................. 47-111805
Nov. 8, 1972 Japan.............................. 47-111806
Nov. 8, 1972 Japan.............................. 47-111807

[52] U.S. Cl................................................ 35/48 R
[51] Int. Cl.²......................................... G09B 5/00
[58] Field of Search.......... 35/6, 8 R, 9 R, 9 A, 9 G, 35/11, 48 R, 48 A, 48 B; 101/171; 197/157

[56] References Cited
UNITED STATES PATENTS
3,087,256  4/1963  Barralon ....................... 35/48 R X
3,300,877  1/1967  Feder................................... 35/9 A
3,432,022  3/1969  Priebs............................ 197/157 X
3,491,464  1/1970  Gray .................................. 35/48 R
3,538,626  11/1970  Frank................................ 35/48 R
3,818,483  6/1974  Yamauchi et al.............. 35/48 R X Primary Examiner—Robert W. Michell
Assistant Examiner—Vance Y. Hum
Attorney, Agent, or Firm—Charles W. Helzer

[57] ABSTRACT

An educational exercising machine is provided wherein a plurality of answers produce different answers for the same problem presented by a teacher, correct and erroneous answers are printed on a recording paper with different colours and the percentages of the correct answers are printed on the same recording paper. Further, 100% correct answers are displayed by a visible display means.

5 Claims, 4 Drawing Figures

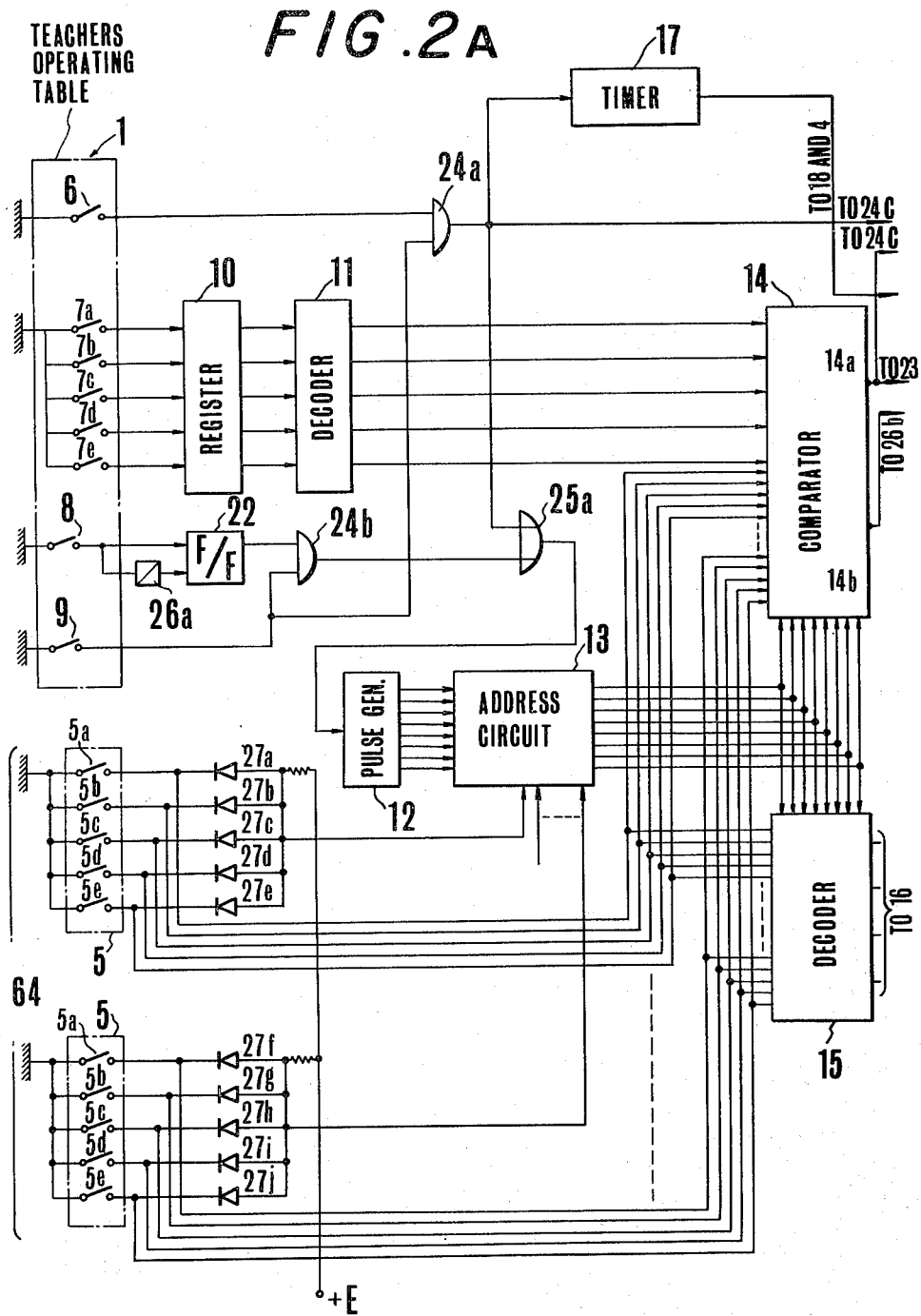

EDUCATIONAL EXERCISING APPARATUS

BACKGROUND OF THE INVENTION

This invention relates to an educational exercising apparatus in which a teacher teaches a plurality of students or answerers.

In using such an educational exercising apparatus it is desirable for the teacher to know whether the answers of respective students for the same problem presented by him is correct or not and to know the percentage of correct answers in order to improve the efficiency of teaching. More particularly, when training a plurality of students, a teacher often presents the same or similar problem for several times to determine the progress of understanding of the students. In such a case, it is highly desirable to readily determine the percentage of the correct answers. If the percentage increases gradually the teacher will be informed of the satisfactory progress of the students.

SUMMARY OF THE INVENTION

Accordingly, it is an object of this invention to provide a simple and efficient educational exercising apparatus suitable for group training of a plurality of students.

A further object of this invention is to provide an improved educational exercising apparatus capable of recording correct and erroneous answers for the same problem with different colours.

A still further object of this invention is to provide an improved educational exercising apparatus capable of recording the percentage of correct answers on the same recording paper as for recording the correct and erroneous answers. Another object of this invention is to provide an improved educational exercising apparatus including means for displaying 100% correct answers.

According to this invention there is provided an educational exercising apparatus comprising means for presenting a problem, a teachers station including a plurality of correct answer switches for producing answer signals corresponding to the correct answers of the presented problems, a recorder including a recording paper and recording means, a plurality of select units each including a plurality of select buttons operated by each answerer for producing different select numbers, a comparator for sequentially comparing the select numbers of the answer units operated by respective answerers with an answer signal produced by one of the correct answer switches to produce different binary signals according to whether the answers provided by respective answerers are correct or not, means responsive to the outputs from the comparator for recording correct and erroneous answers with different colours, a timing pulse generator for producing a plurality of timing pulses of the number equal to the number of the answerers, an address circuit responsive to the timing pulses, for detecting the answer units operated by respective answerers to produce address pulses of the selected answer units, a decoder responsive to the address pulses for decoding the select numbers produced by the answer units into different data signals, and means for supplying the data signals to the recording means for recording on the recording paper the select numbers of the answers produced by the select units.

According to another aspect of this invention, the exercising apparatus described above further comprises a group select switch provided in the teachers station, a timer operated by the group select switch for producing a pulse at each unit time, a circulating register responsive to the pulse from the timer for counting the number of binary signals produced by the comparator and representing the correct answers, an address setter responsive to the output from the circulating register for designating an address on the recording paper, a second decoder responsive to the output from the circulating register for printing a predetermined symbol at the designated address, whereby the percentage of the correct answers at each unit time is printed on the recording paper.

The circulating register is provided with a feedback circuit so that it counts the percentage of correct answers during a unit time and such percentage of correct answers is also printed on the same recording paper. There is also provided a 100% detector which operates when the percentage of the correct answers reaches 100%.

BRIEF DESCRIPTION OF THE DRAWINGS

In the accompanying drawings;

FIG. 2A is a block diagram showing the detail of a portion of the embodiment shown in FIG. 1.

DESCRIPTION OF THE PREFERRED EMBODIMENT

Figure 1:
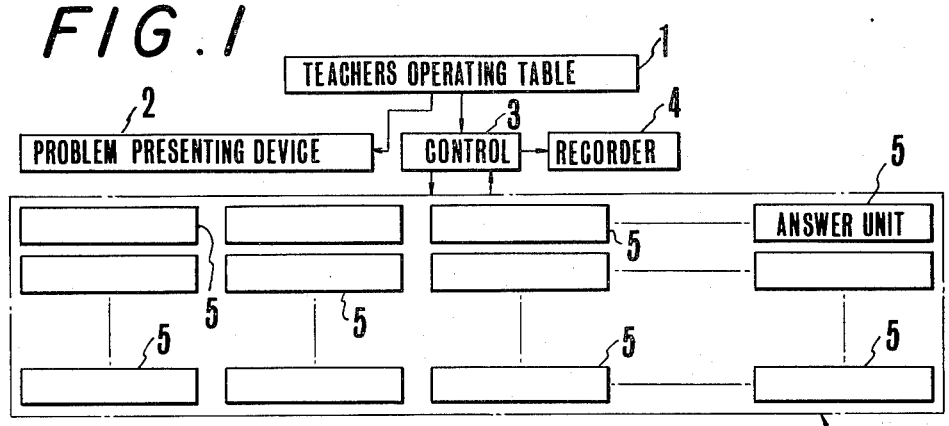
FIG. 1 is a block diagram showing one embodiment of this invention.

A preferred embodiment of the novel educational exercising apparatus diagrammatically shown in FIG. 1 comprises a teachers operating table 2, a problem presenting device in the form of a slide projector, for example, for presenting programmed problems, a control device 3, a recorder 4 which records the correct and erroneous answers with different colours as the percentage of the correct answers provided by the students, and answer units 5 each including five select buttons 5a through 5e (see FIGS. 2A and 2B) and a reset button (not shown). In this example, 64 anwer units are provided for 8 × 8 = 64 students, for example.

Figure 2B:
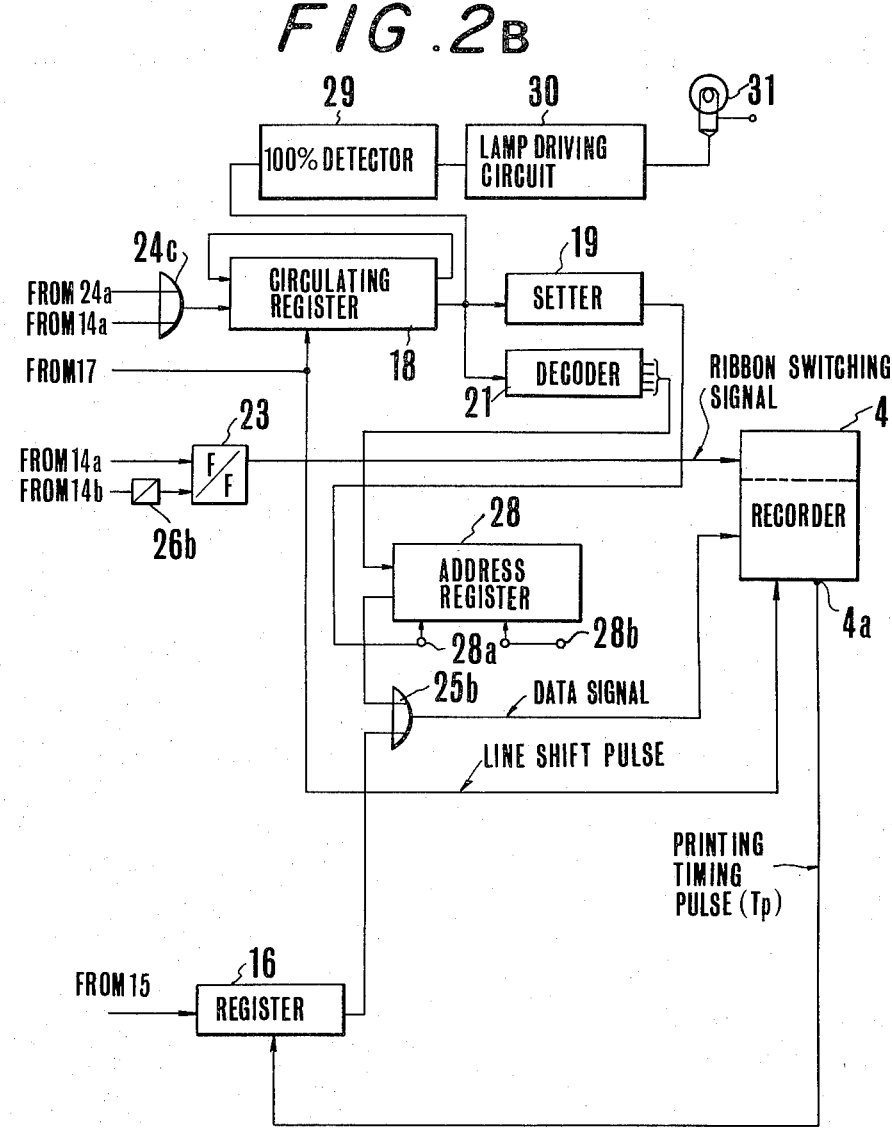
FIG. 2B is a block diagram showing the detail of a portion of the embodiment shown in FIG. 1 in combination with FIG. 2A.

As shown in FIGS. 2A and 2B, the teachers operating table 1 comprises a group switch 6, correct answer switches 7a through 7e, for providing signals representing the correct answers of the selected numbers for each problem, a personal switch 8 and a start switch 9. The numbers of the correct answers provided by correct answer switches 7a through 7e are temporarily stored in a register 10 whose outputs are applied to a comparator 14 through a decoder 11. A pulse generator 12 is provided for sequentially applying 64 timing pulses to an address circuit 13 which operates to select the answer units 5 of respective answers for sending out address pulses of the answer units 5 in response to the timing pulses from the pulse generator 12. The comparator 14 operates to sequentially compare the select numbers of the answer units 5 selected by the answeres with the select number of the correct answer for the problem for producing a 1 signal at an output terminal in the case of the correct answers, whereas a 0 signal at an output terminal 14b where the answers are not correct. There are also provided a decoder 15 which decodes the select numbers provided by select buttons 5a through 5e of the answer units 5 of respective answerers into data signals representing 1, 2, 3, 4 and 5 (see FIG. 3), and a register 16 which operates to temporally store the data signals from the answer units 5 of respective answerers and to shift its contents in response to a printing timing pulse $T_p$ supplied from a terminal 4a of the recorder 4. A timer 17 is operated when the group select switch 6 is closed for producing a pulse at each unit time. A circulating register 18 operates to count the number of correct answer signals produced by the comparator 14 and to send out its content in response to the pulse of unit time supplied by timer 17, the sent out content being applied back to the input of the circulating register 18 for recirculation. A setter 19 operates to set the addresses on a recording paper 20 (see FIG. 3) in accordance with the content (represented by %) of the circulation register 18. In the example shown in FIG. 3, the spacing between adjacent columns corresponds to 5% so that 20 addresses equal to 100%. The output from the circulating register 18 is also supplied to a decoder 21 which operates to print a symbol * on the recording paper 20.

The personal switch 8 is connected to a flip-flop circuit 22 for enabling the circuit to cross check responses from the answerers against the correct answer. The output on terminal 14a of the comparator 14 is supplied to a red-black switching flip-flop circuit 23 which operates to select a black ribbon in response to a 1 output whereas a red ribbon in response to an 0 output. There are also provided AND gate circuits 24a, 24b and 24c, OR gate circuits 25a and 25b, inverters 26a and 26b and diodes 27a through 27j, which are connected as shown in FIGS. 2A and 2B. An address register 28 is provided for designating the address positions (20 addresses in this example) on the recording paper 20. The address register 28 is constructed such that it will be shifted toward right in response to a shift pulse applied to one input terminal 28a whereas toward left in response to an input applied to the other input terminal 28b, thereby supplying an output signal to the OR gate circuit 25b. A 100% detector 29 is connected to the output of the circulating register 18 to detect the content thereof. When the content of the register reaches 100% an indicating lamp 31 is energized through a lamp driving circuit 30.

The educational exercising apparatus described above operates as follows. When a problem is displayed on the problem presenting device 2, each answerer depresses one of the select buttons 5a through 5e of the answer unit 5.

After closing one of the correct answer switches 7a through 7e corresponding to the correct answer of the presented problem the teacher closes the personal switch 8 and the start switch 9 on the teachers operating table 1. Accordingly, the flip-flop circuit 22 is set to 1 and the AND gate circuit 24b produces an output signal 1 by the closure of the start switch 9. The output signal 1 produced by the AND gate circuit 24b is applied to the pulse generator 12 via the OR gate circuit 25a. Consequently, the pulse generator 12 is actuated to impress 64 pulses corresponding to 64 students upon the address circuit 13.

Signals produced by select switches 5a through 5e of the answer units 5 of respective answerers are impressed upon the address circuit 13 through corresponding ones of the diodes 27a through 27j. As a consequence, the address circuit 13 supplies to the comparator 14 and decoder 15 address pulses of respective answerers.

Thus, the comparator 14 compares the select numbers of the correct answer with the select numbers of the respective answerers. When the answer is correct a 1 signal is produced at terminal 14a to set the flip-flop circuit 23 whereby the ribbon of the recorder 4 is switched to the black ribbon. When the answer is erroneous, a 0 signal is produced at terminal 14b to reset the flip-flop circuit 23 whereby the ribbon of the recorder 4 is switched to the red ribbon.

Figure 3:
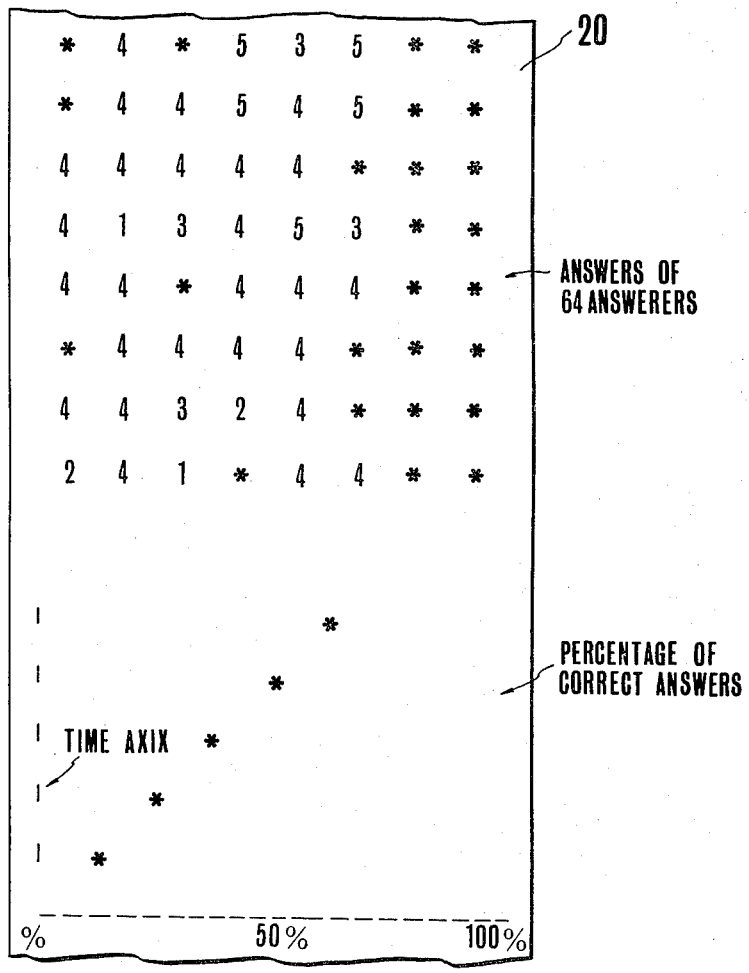
FIG. 3 shows a portion of the recording paper recorded with the results of the exercise.

The select numbers of respective answerers are decoded by decoder 15 in accordance with the address pulses from the address circuit 13. The decoded signals are temporarily stored in register 16 and then sent to the recorder 4 in accordance with the printing timing pulses $T_p$ from the recorder 4 so as to be printed as 1 through 5 as shown in FIG. 3.

As described above, where the answers are correct they are printed with the black ribbon whereas where the answers are erroneous they are printed with the red ribbon. Where there is any absent student or one who did not operate the select switches, symbols * are printed with the red ribbon.

For the purpose of providing a group recording, the teacher first closes the group switch 6 and then the start switch 9 thus sending out a 1 output from the AND gate circuit 24a which is used to operate the timer 17 and to enable the AND gate circuit 24c. The 1 output from the AND gate circuit 24a also actuates the pulse generator 12 via the OR gate circuit 25a.

When the AND gate circuit 24c is enabled the signals representing correct answers are applied to the circulating register 18 to be counted thereby. Circulating register 18 may be of the type for performing serial division of the total number of correct answers with the total number of answerers in accordance with the expression $$\frac{\text{CORRECT ANSWERS}}{\text{TOTAL ANSWERERS}} \times 100.$$

Such circulating shift register dividers are well known in the art and may be comprised by a circulating shift register divider of the type illustrated and described in Sec. 15–16, Pages 511–516 of the textbook entitled, *Digital Computer and Control Engineering* by R. S. Ledly, published by McGraw-Hill Book Co. in 1960 (first edition), library of Congress Catalog Card No. 59-15055. In such an arrangement the total number of correct answers would, of course, comprise the dividend and the total number of answerers the divisor.

An alternative arrangement to that described above would be to include a per cent operator circuit in the output from a conventional circulating shift register serial adder of the type described on pages 502–506 of the above-referenced textbook by R. S. Ledly. The use and implementation of either expedient to obtain the desired percentage of correct answers in each unit time for supply to setter 19 at the output of circulating register 18, is believed obvious to one skilled in the art in the light of the teachings of the instant disclosure. The output of the register 18 is applied to the setter 19 under the control of the pulses which are supplied by the timer 17 at each time for designating the address on the recording paper 20 according to the content. The output from the circulating register 18 is decoded by the decoder 21 into a signal representing the symbol * so as to print the symbol * at the position of the designated address, said signal being set in a predetermined position in the address register 28. In this manner, the outputs from the circulating register are set sequentially in the address register 28 so as to print the symbols * at the addresses corresponding to the percentage of the correct answers in each unit time.

The address register 28 is shifted toward left by the shift pulse applied to terminal 28b and the output from the address register 28 is applied to the recorder 4 through the OR gate circuit 25b. The recording line of the recorder is shifted by the pulse supplied from the timer 17 at each unit time so that the percentage of the correct answer of the group can be recorded as shown by a graph depicted in the lower portion of the recording paper, as shown in FIG. 3. As the percentage of the correct answer of the group reaches 100%, the 100% detector 29 operates to light the indicating lamp 31 via the lamp driving circuit 30.

It should be understood that the exercising machine of this invention may be constructed for different numbers of students or answerers.

As above described, the invention provides an improved eductional exercising apparatus in which the correct answers and erroneous answers of the respective answerers are recorded with different colors on the same recording paper so that the teacher can readily determined the results of respective answerers. Furthermore, since the percentage of the correct answers of the group is plotted on the same recording paper and since 100% correct answer is displayed by a lamp or the like, it is convenient for the teacher to determine the result of his effort. Thus, for example, the teacher can repeatedly present the same or similar problem until all or substantially all of the students can correctly solve the problem, thus increasing the efficiency of the exercise.

What is claimed is:

1. An educational exercising apparatus for use in conjunction with some means for presenting a problem, said apparatus comprising a teacher's station including a plurality of correct answer switches for producing answer signals corresponding to the correct answers of the presented problems, a recorder including recording paper and recording means, a plurality of student answerer units each including a plurality of select buttons operated by each answerer for producing difference select numbers, a comparator for sequentially comparing the select numbers of the answer units operated by respective answerers with an answer signal produced by one of said correct answer switches to produce different binary signals according to whether the answers provided by respective answerers are correct or not, means responsive to the output from said comparator for recording on said recording paper individual correct and erroneous answers for each answerer with different colours, a timing pulse generator for producing a plurality of timing pulses of the number equal to the number of the answerers, an address circuit responsive to said timing pulses for selecting the answer units operated by respective answerers to produce address pulses of said selected answer units, a first decoder responsive to said address pulses for decoding the select numbers produced by said answer units into different data signals, means for supplying said data signals to said recording means for recording on said recording paper the select numbers of the answers produced by said student answerer units, a selectively operable group select switch provided in said teacher's station, a second timer operated by said group select switch for producing a pulse at each unit time, percentage counter means responsive to the pulses from said second timer and said comparator for deriving a percentage count output signal indicative of the number of the binary signals produced by said comparator representing correct answers, an address setter responsive to the output signal from said percentage counter means for designating an address on said recording paper, a second decoder responsive to the output from said percentage counter means for printing a predetermined symbol on said recording paper at said designated address, whereby the percentage of the correct answers in each unit time is printed on said recording paper.

2. An educational exercising apparatus according to claim 1 wherein said different data signals produced by said first decoder are stored in a register, means in said recorder for producing a printing timing signal, and means for supplying the different data signals stored in the register to the recorder under control of the printing timing signal supplied from said recorder.

3. An educational exercising apparatus according to claim 1 further including a 100 % correct answer detector connected to the output of said percentage counter means.

4. An educational exercising apparatus according to claim 3 which further includes display means connected to the output from said 100% correct answer detector and which is operated upon said 100%. detector detecting 100% correct answers.

5. An educational exercising apparatus according to claim 4 which further includes means for recording a predetermined symbol on said recording paper together with said data signals which is representative of an absent answerer or an answerer who does not operate his answer unit.

* * * * *